(No Model.)
S. SHELDON & J. J. ROONEY.
ALTERNATING ELECTRIC CURRENT GENERATOR.
No. 502,777. Patented Aug. 8, 1893.
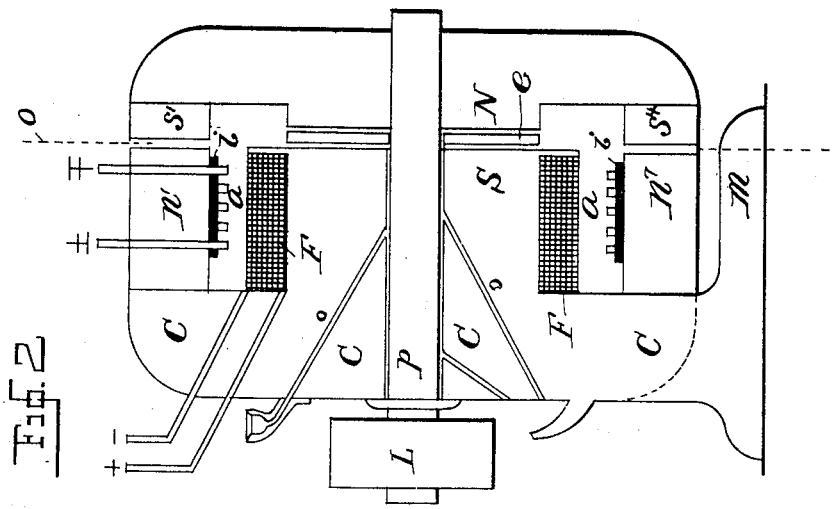
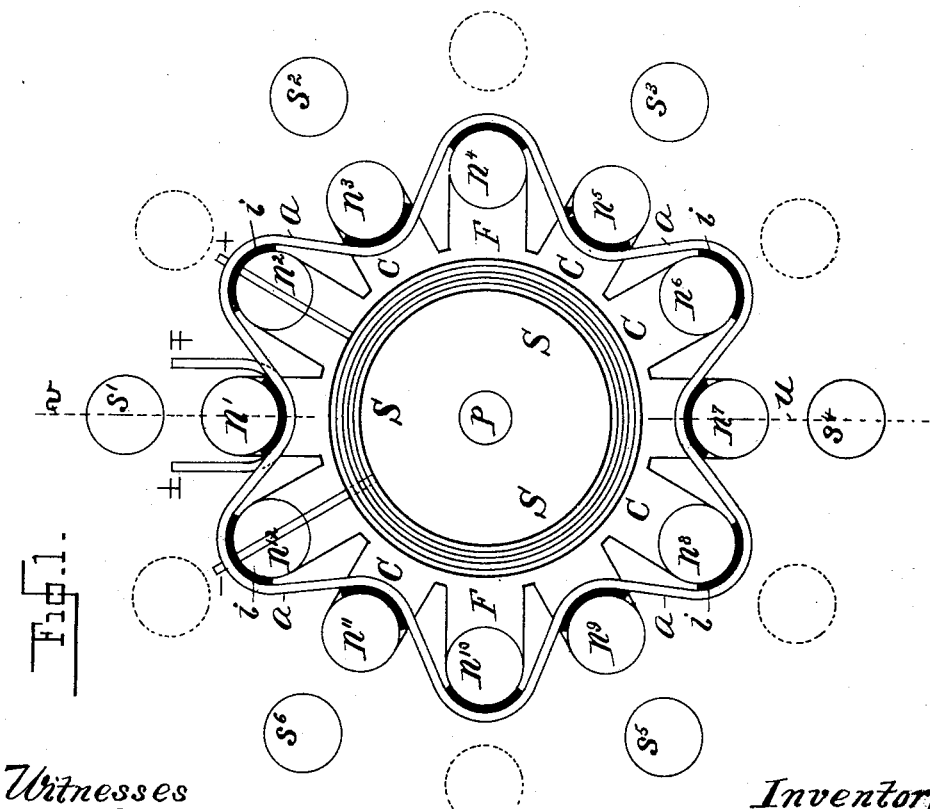
Witnesses
Wm H. Courtland
Leocadia M. Lennan
Inventors
J. J. Rooney + S. Sheldon
By their Attorney.
Edward P. Thompson

UNITED STATES PATENT OFFICE.

SAMUEL SHELDON AND JOHN JOSEPH ROONEY, OF BROOKLYN, NEW YORK.

ALTERNATING-ELECTRIC-CURRENT GENERATOR.

SPECIFICATION forming part of Letters Patent No. 502,777, dated August 8, 1893.

Application filed September 28, 1892. Serial No. 447,201. (No model.)

*To all whom it may concern:*

Be it known that we, SAMUEL SHELDON and JOHN JOSEPH ROONEY, both citizens of the United States of America, and residents of Brooklyn, in the county of Kings, State of New York, have invented certain new and useful Improvements in Alternating-Electric-Current Generators, of which the following is a specification.

Our invention relates to a dynamo for generating an alternating current, and the objects of the invention are to simplify the manner of winding the electric conductors; to reduce to a minimum the possibility of heating under abnormal currents; to increase the efficiency of generation; and to simplify the mechanical construction of the complete device.

The nature of the invention in detail is represented in the accompanying drawings.

Figure 1 is a vertical elevation of the machine, the part to the right of the line $m$—$o$ in Fig. 2 being removed. Surrounding the machine in this figure are dotted and full line circles which represent two phases of the poles of one of the elements of the machine. The poles are shown as moved outwardly radially farther than in practice so that they will appear in the figure. Fig. 2 is a vertical section of the complete machine shown in Fig. 1 taken at the line $u$—$v$ in Fig. 1.

In both figures certain details, convenient in practice, are omitted as they have nothing to do with the invention. For instance the cores of the magnets are not shown laminated.

$p$ is a shaft to which are fixed the usual pulley L and a multipolar keeper K having poles $s'$, $s^2$, $s^3$, $s^4$, $s^5$, $s^6$. This keeper is preferably of soft iron, but may be made of any magnetic material, as for example, cast-iron or nickel. The shaft $p$ and the pulley L and keeper, or armature core, K are the only parts which are movable in the machine.

C is the field magnetic core having a central pole S surrounding the shaft $p$ and provided with a field magnet winding F whose terminals are marked plus and minus. The pole S is directly opposite and facing the central pole N of the armature K. The pole N is concentric with the poles $s'$, $s^2$, $s^3$, $s^4$, $s^5$, $s^6$. The core C has polar extensions $n'$, $n^2$, $n^3$, $n^4$, $n^5$, $n^6$, $n^7$, $n^8$, $n^9$, $n^{10}$, $n^{11}$, $n^{12}$, arranged concentrically around the pole S and at the same distance from the center as the poles $s'$, $s^2$, $s^3$, $s^4$, $s^5$, $s^6$, and just escaping the same. It will be noticed that the number of north poles $n'$, $n^2$, $n^3$, &c., on the stationary core C is double that on the rotary core or armature K. This proportion should always be thus for greatest effect, but of course, the actual number of poles may be different in different machines. It is preferable that the poles $n'$, $n^2$, $n^3$, &c., should be equally displaced from one another and so should the poles $s'$, $s^2$, $s^3$, &c. The winding F is made in the usual manner by means of convolutions of an electric conductor surrounding the central core and pole S. There is another winding made by the conductor $a$ wound in convolutions whose side view is said to be in a zigzag wave like path. The terminals are marked plus or minus and minus or plus. All the convolutions of the conductor are parallel to one another. Their path may be designated as follows, beginning at the pole $n'$. They start on the inner side of the pole $n'$, pass to the outer side of the pole $n^2$, then to the inner side of the pole $n^3$, then to the outer side of the pole $n^4$, then to the inner side of the pole $n^5$, and so on around substantially to the starting point. The convolutions form, when taken together, a wave shaped coil in which the poles or cores are arranged in the successive waves.

The coil F is traversed by a continuous current, so that the pole S becomes, for example, south, and the poles $n'$, $n^2$, $n^3$, &c., north. By magnetic induction the pole N of the keeper K becomes north and the poles $s'$, $s^2$, $s^3$, &c., become south. When the shaft $p$ is at rest there is no current in the conductor $a$. When the shaft $p$ rotates, and when the poles $s'$, $s^2$, $s^3$, &c., move from the odd poles $n'$, $n^3$, $n^5$, &c., to and opposite the even poles $n^2$, $n^4$, $n^6$, &c., i. e., from the outside of the coil to the inside, an impulse of current, increasing from zero to maximum and again to zero, is generated. When the poles $s'$, $s^2$, $s^3$, &c., move again from the even poles $n^2$, $n^4$, $n^6$, &c., to and opposite the odd poles $n^3$, $n^5$, $n^7$, &c., i. e. from the inside of the coil to the outside, an electric impulse of the opposite direction is generated. When the poles $s'$, $s^2$, $s^3$, &c., move to their next corresponding positions inside of the coil, a third electric impulse of the same direction as the first is generated. The continuous rotation of the armature K continues to generate successive alternating electric impulses or an alternating electric current.

It is evident that the conductor $a$ may be wound very rapidly and cheaply in the machine illustrated. Insulation $i$ is used between the poles $n'$, $n^2$, $n^3$, &c., and the conductor $a$, the convolutions of which do not touch each other so that the conductor $a$ being bare, is exposed at substantially all points, to the cooling effect produced by the air, which is set in motion by the rotating armature. For convenience the coil F may be called the field magnetic coil, and the zigzag coil may be called the armature coil, because it is that in which a constant current is generated.

The conduits $o$ belong to the lubricating system which need not be further described. The annular disk $e$, of non-magnetic material, between the poles S, N prevents the sticking of the same to each other.

We claim as our invention—

1. A dynamo consisting of the combination of wave or zigzag shaped stationary convolutions of an electric conductor, energized polar extensions of a given constant polarity, arranged alternately within and without the convolutions; and polar extensions of a different number from those of the first set, of an opposite constant polarity arranged within inductive action of the extensions first named; the two sets of polar extensions being relatively movable.

2. A dynamo consisting of the combination of a stationary field magnet, a field magnet winding F thereon, a central pole S, and concentric polar extensions $n'$, $n^2$, $n^3$ &c. forming a part of the stationary field magnet, a coil of an electric conductor passing alternately to the inner and outer sides of the successive extensions $n'$, $n^2$, $n^3$ &c., and an iron armature rotary relatively to the field magnet, and having a central pole opposite the pole S, and concentric poles $s'$, $s^2$, $s^3$ &c. opposite the said poles $n'$, $n^2$, $n^3$ &c., in number equal to one half or twice that of the poles $n'$, $n^2$, $n^3$ &c.

3. A dynamo consisting of the combination of a stationary zigzag or wave like electric conductor, a stationary field magnet having poles of a given constant polarity, arranged successively on opposite sides of the conductor within the waves thereof, and a movable armature whose poles are of an opposite constant polarity, and are arranged within inductive action of the first named poles, and are in number less or greater than that of the first named poles.

4. A dynamo consisting of relatively movable sets of polar extensions respectively of different constant polarities, and a stationary electric conductor within inductive action of the same and extending alternately to opposite sides of the successive extensions of one set.

In testimony that we claim the foregoing as our invention we have signed our names, in presence of two witnesses, this 20th day of September, 1892.

SAMUEL SHELDON.
JOHN JOSEPH ROONEY.

Witnesses:
E. G. DUVALL, JR.,
EDWARD P. THOMPSON.